Figure 1:
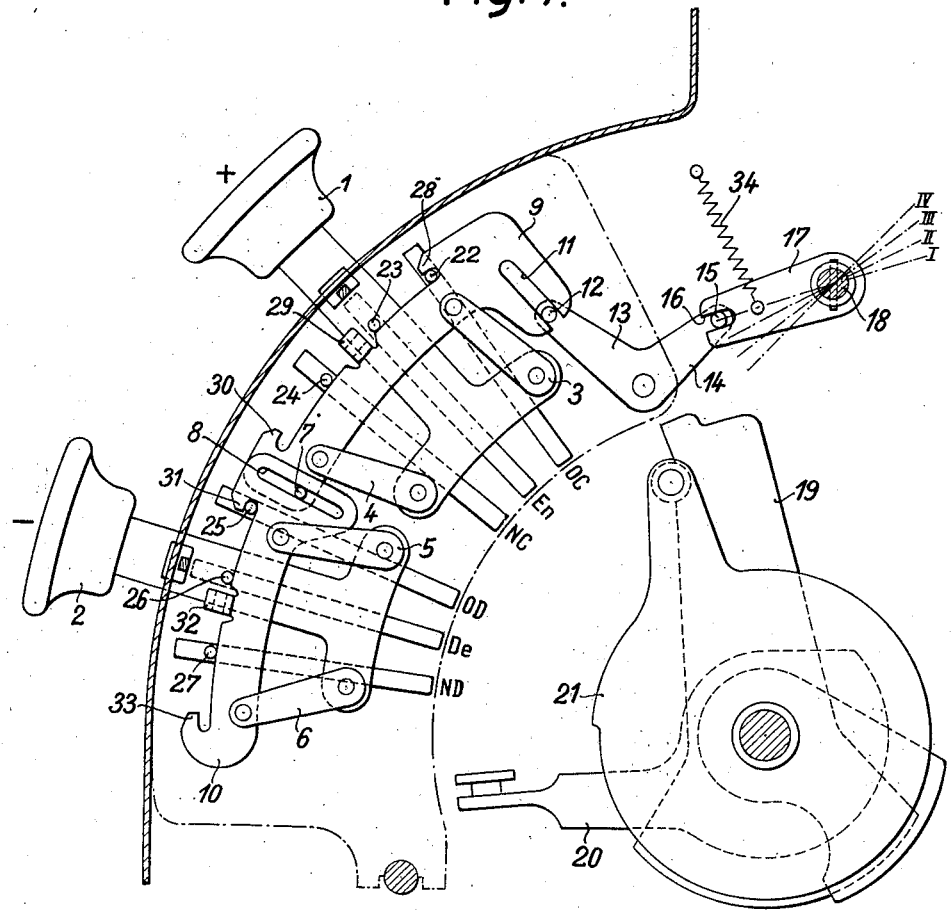

Feb. 8, 1938.  A. KLAAR ET AL  2,107,445
CONTROLLING MECHANISM FOR CASH REGISTERS AND BOOKKEEPING MACHINES
Filed Aug. 30, 1934  5 Sheets-Sheet 1

Inventors
Albert Klaar
Friedrich Arndt
and Helmut Berning
By *Carl Beust*
Their Attorney

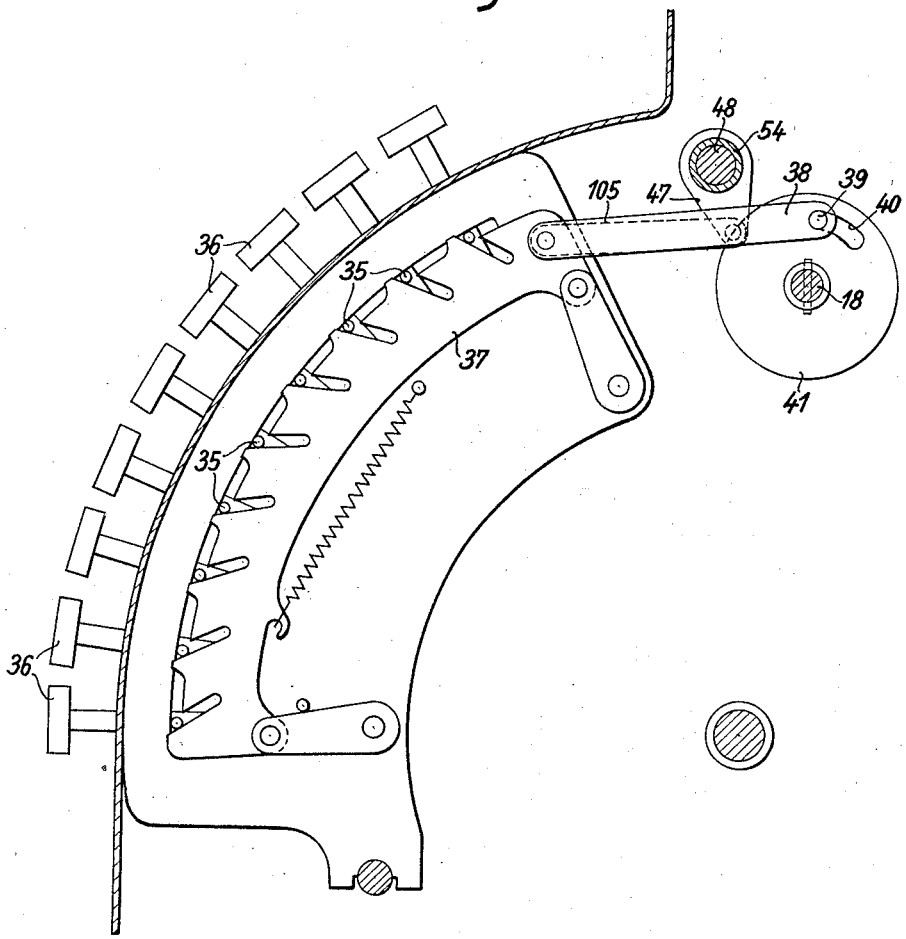

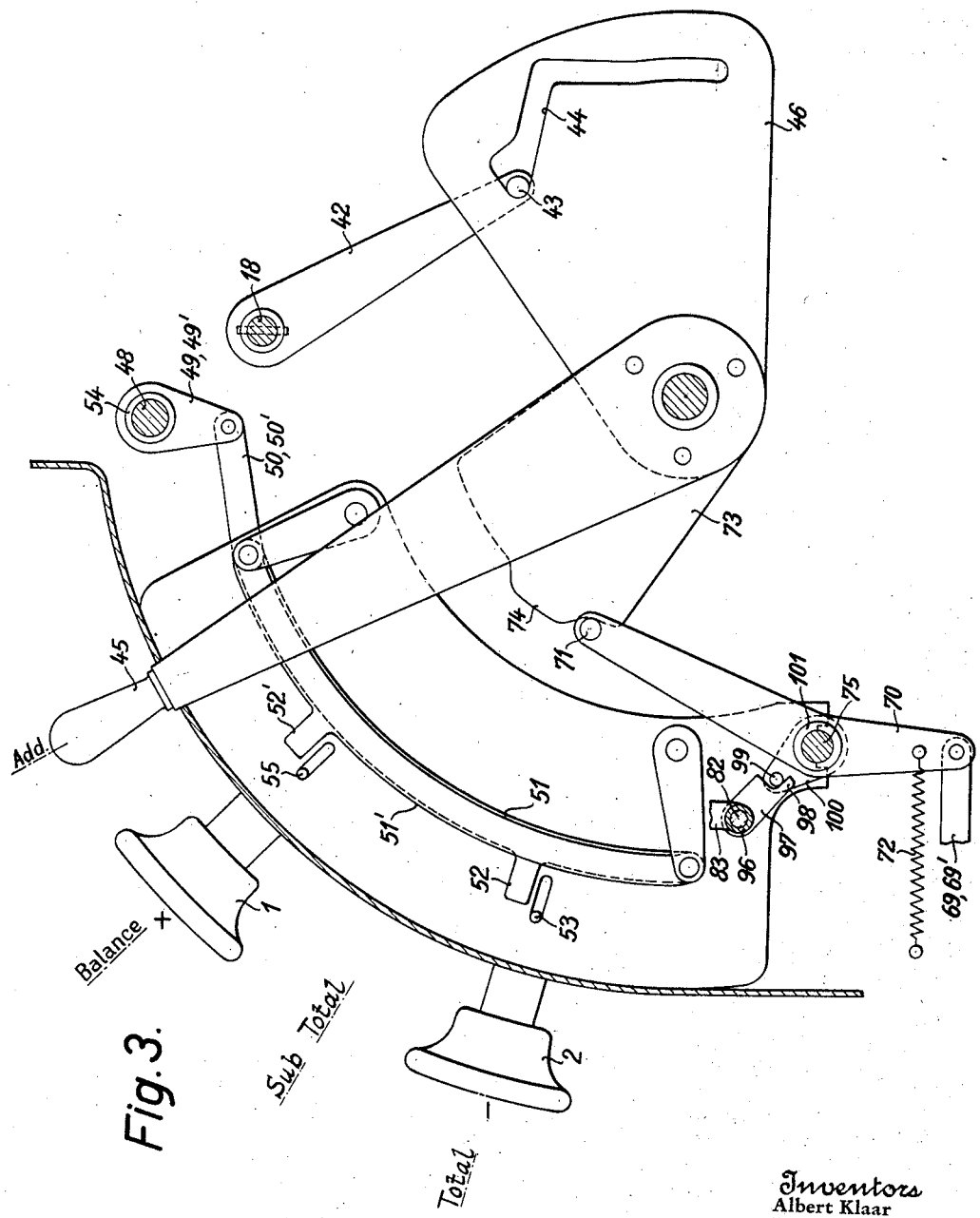

Feb. 8, 1938. A. KLAAR ET AL 2,107,445
CONTROLLING MECHANISM FOR CASH REGISTERS AND BOOKKEEPING MACHINES
Filed Aug. 30, 1934 5 Sheets-Sheet 4
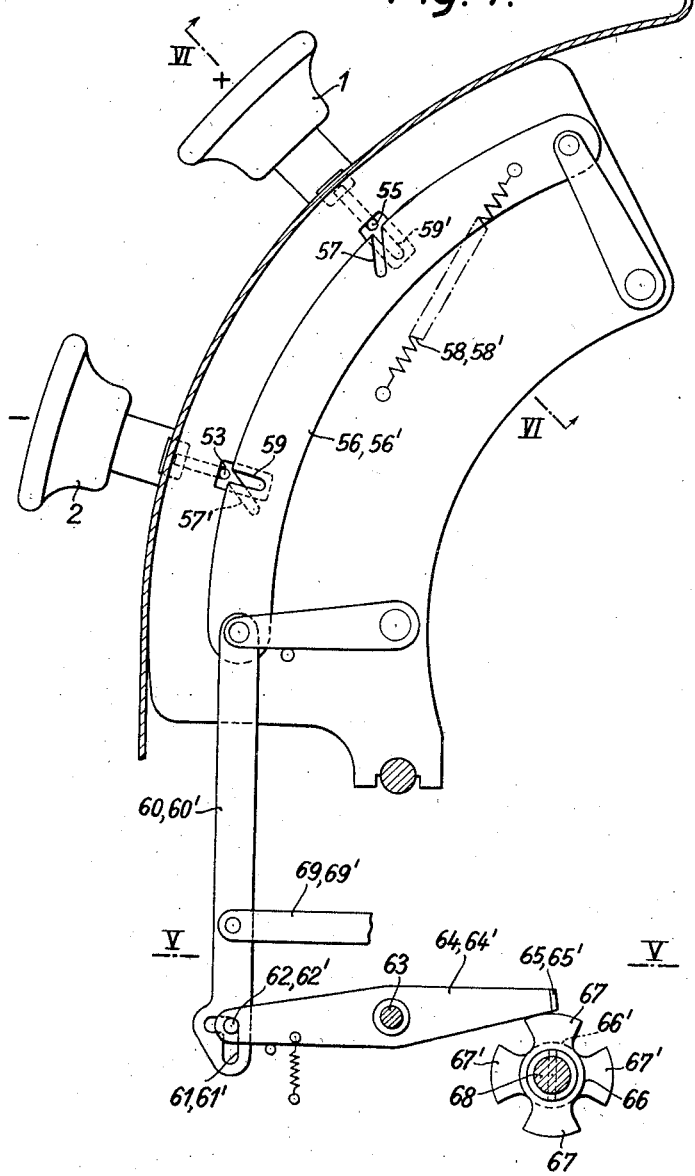
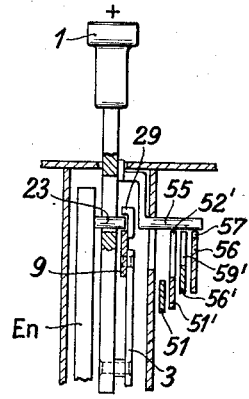
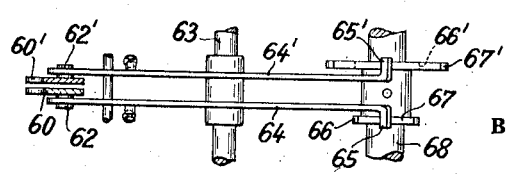
Inventors
Albert Klaar
Friedrich Arndt
and Helmut Berning
By Carl Beust
Their Attorney

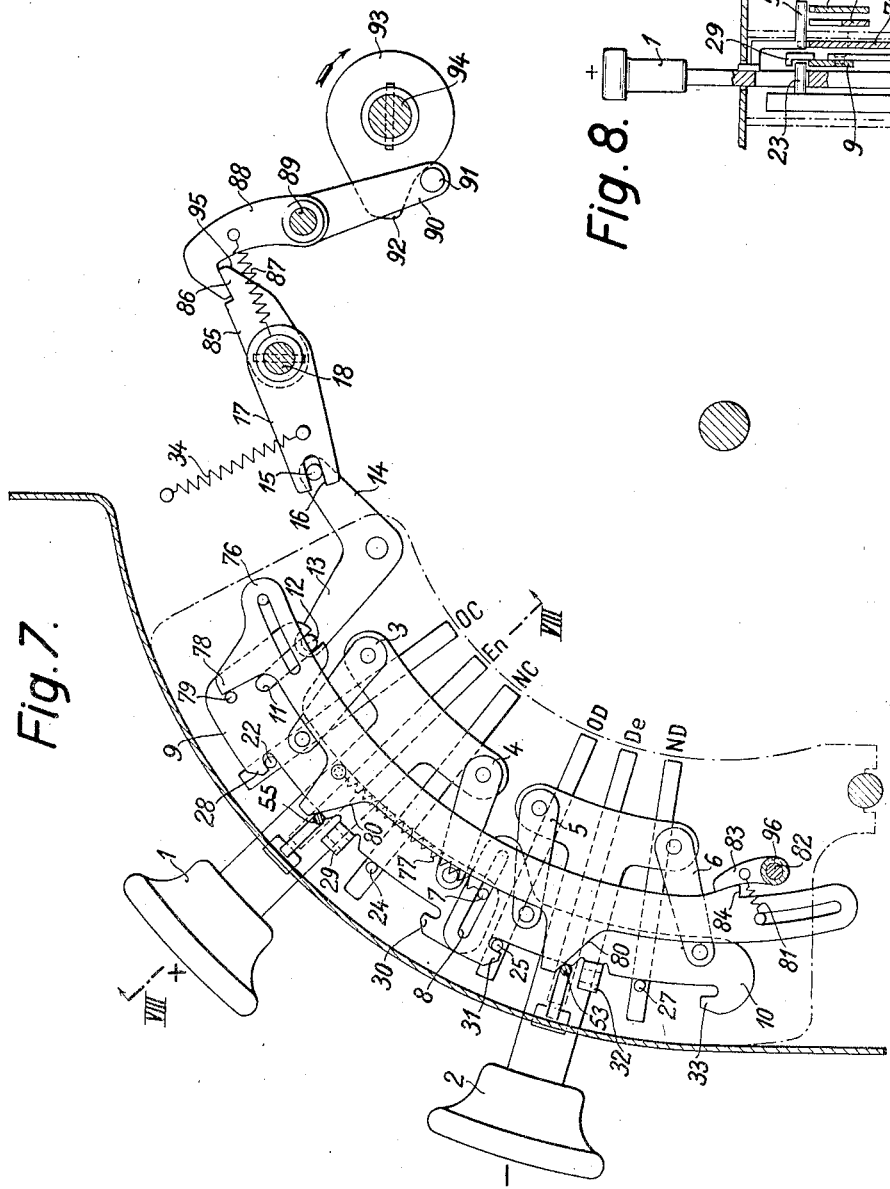

Patented Feb. 8, 1938

2,107,445

UNITED STATES PATENT OFFICE 2,107,445

CONTROLLING MECHANISM FOR CASH REGISTERS AND BOOKKEEPING MACHINES

Albert Klaar, Bielefeld, and Friedrich Arndt and Helmut Berning, Essen, Germany, assignors, by mesne assignments, to The National Cash Register Co., Dayton, Ohio, a corporation of Maryland Application August 30, 1934, Serial No. 742,098
In Germany August 31, 1933

12 Claims. (Cl. 235—130)

The invention relates to cash registers and book-keeping machines in which series of book-keeping operations may be executed which consist of several machine operations that belong together.

According to the invention a key is provided in such a machine each for the positive and negative entries by the depression of which keys the machine operation caused thereby is determined both as to its sign—for example by the selection of the corresponding sides of the balance mechanism—and as to the varying modes of operation required by the entry to be made, such as selection of determined totalizers and print signs. In this way the advantage is achieved that with all subsequent entries of the same sign of a series of book-keeping operations the machine is capable of executing, always one and the same key only has to be depressed and that, if selectively the sign is changed, two keys suffice for all entries of the book-keeping operations.

The invention further provides that the determination of the modes of the individual machine operations is effected by a controlling member that co-operates with the said keys and can assume different positions. The adjustment of this controlling member depends on the mode of the machine operation under consideration and is effected according to the invention by the depression of the said keys. Furthermore, in machines which calculate the new balance from the old balance and the transactions and take up the transactions made in subdivision as to line of business, kind of articles sold and so forth, the adjustment of the controlling member to the mode of operation "transaction" may be made by means of the special keys that cause the entering and deducting operations.

The invention further provides that in certain machine operations the controlling member is not displaced, in particular in machine operations which are the first of a series of operations of the same kind, such as a series of transactions, and, further, that a setting member, such as a mode of operation lever, is provided by which the displacement of the controlling member is released again.

In order that the invention may be clearly understood and readily carried into effect, some embodiments of the same are illustrated by way of example in the accompanying drawings in which Figure 1 is a side elevation of the motor keyboard, Figure 2 is a side elevation of the credit totalizer keyboard, Figure 3 shows a detent mechanism of the motor keys and the mode of operation lever, Figure 4 shows a further detent mechanism of the motor keys, Figure 5 is a section on line V—V of Figure 4, Figure 6 is a cross section of the motor key on the line VI—VI of Figure 1, Figure 7 shows, in a view similar to that of Figure 1, a modification of the motor keyboard, and Figure 8 is a cross section of the motor key 1 on the line VIII—VIII of Figure 7.

Referring first to Figures 1–5, the machine illustrated in these figures is designed for the execution of book-keeping operations composed of a plurality of individual entries, for example for the calculation of a new balance from an old balance and transactions. In addition to the amount keys the machine comprises two rows of secondary totalizer keys 36, and in particular one row for the debit totalizers and another row for the credit totalizers, and, further, two selecting keys 1, 2, designed as starting members (motor keys), the one, 1, of which selects the positive entries while the other, 2, determines the negative ones, for example by selecting the corresponding side of the balance mechanism. The motor keyboard has further mounted on it six stops OC, E$n$, NC, OD, D$e$, ND, formed by key-shafts and allotted to the positive and negative values of the old balances (OC and OD), to the transactions (entries E$n$ and deductions D$e$) and to the new balances (NC and ND), and like known keyshafts of this kind may be used for the selection of the respective print sign and totalizers. Finally, there is provided a mode of operation lever which by its four positions "addition", "balance", "sub-total" and "total" determines the mode of operation of the machine.

On each of the enlarged feet of the motor keys 1 and 2, Figure 1, are hinged two links 3, 4 and 5, 6 which carry two slides 9 and 10 that form controlling members. These two slides are coupled with one another by a pin and slot connection 7, 8 which permits the two slides to be displaced radially and independently on one another by depression of the motor keys 1, 2. A slot 11 provided in slide 9 and extending in this radial direction of motion is engaged by a pin 12 carried by a bell crank lever 13, 14. The arm 14 thereof carries a pin 15 which engages a slot 16 of a lever 17 rigid to a shaft 18. In this manner the slides 9, 10 are positively coupled with the shaft 18.

The keyshafts OC, OD, En, De, NC, ND mounted on the motor keyboard in known manner cooperate with an actuating mechanism 19, 20, 21. The motor keyboard further comprises a zero pawl (not shown) which holds the main differential actuator 19 in position to rest if none of the keyshafts has been depressed into the orbit of the actuators 19, 20. The keyshafts carry pins 22—27 which alternatively can be caused to engage the slides 9, 10. To this end the latter are provided with hook-shaped projections 28—33 which according to the position of the slides engage over the respective keypins 22—27 and entrain them and thus the respective keyshafts upon depression of the motor keys.

The slides 9, 10 are capable of assuming four different positions:

1. If the slides are in the lowermost position shown in Figure 1 (position I), that corresponds to the first machine operation (old balance), the hooks 28 and 31 engage over the key pins 22 and 25.

2. If the slides have been raised one unit (position II), which position corresponds to the second machine operation and to subsequent transaction operations, if any, the hooks 29 and 32 engage over the pins 23 and 26.

3. In a third position from below (position III), which corresponds to the subtotal taking and total taking operations of the secondary totalizers, none of the hooks 28—33 engages over one of the pins 22—27.

4. If the slides 9, 10 have reached their uppermost position (position IV), which corresponds to the balancing operation, the hooks 30 and 33 engage over the pins 24 and 27.

The displacement of the two slides 9, 10 to their different positions is effected by the shaft 18 which, as mentioned, is coupled therewith and normally under the action of a spring 34 assumes the position of rest shown in Figure 1. According to the invention, shaft 18 is turned to the three remaining positions by means of the following arrangement: In the keyboard for the credit totalizers, Figure 2, is mounted a slide 37 which upon depression of one of the keys 36 is lowered by the respective pin 35. The slide 37 has hinged to it a link 38 the pin 39 of which is guided in a slot 40 of a disc 41 rigid to shaft 18. Upon depression of a key 36 a motion to the left is imparted to pin 39 through the members 35, 37, 38, whereby one unit of rotation in counter-clockwise direction is imparted to the disc 41 and thus to shaft 18. This rotation has such an amplitude that the slides 9, 10 are shifted from position I to position II. An arrangement (not shown) that exactly corresponds to the members 35—41 is provided also in the keyboard for the debit totalizers. Consequently, upon depression of a debit key the slides 9, 10 are likewise shifted to position II. If a key is depressed in one of these two keyboards, the pin 39 of the other keyboard slides without effect in the appurtenant slot 40.

The shaft 18 has further rigidly mounted on it an arm 42, Figure 3, the pin 43 of which engages a cam slot 44 of a sector 46 rigid to the mode of operation lever 45. The cam slot has such a shape that the pin 43, if the mode of operation lever stands on "addition" admits a motion of shaft 18 and thus of the slides 9, 10, into their positions I and II. If the mode of operation lever is set to a "Balance" position, shaft 18 is turned in counterclockwise direction through the parts 44, 43, 42 so as to come to its position corresponding to slide position IV. When this takes place, the pins 39, Figure 2, slide without effect in the slots 40. Finally, in the two total-taking positions of the mode of operation lever shaft 18 under the action of the cam slot 44 assumes its position III.

As already mentioned, two motor keys 1 and 2 are provided, for the positive and negative entries. In order to prevent depression of the wrong one of the two keys, after the sign of the machine operation has already been determined, for example by the debit and credit totalizers or by the amount in the balance mechanism, the following detents are provided:

The slide 37 of the credit keyboard, Figure 2, is connected by a link 105 to an arm 47 which is rigid to a hollow shaft 54 mounted on a shaft 48. The hollow shaft 54 has further fast to it an arm 49, Figure 3, which is connected by a link 50 to a slide 51 mounted in the motor keyboard. Slide 51 has a projection 52 which upon depression of a credit key 36 through the parts 105, 47, 54, 49, 50, 51 is shifted below a pin 53 carried by the motor key 2. This prevents depression of the negative motor key 2 when positive entries are to be summed up in the credit totalizers. In a similar manner (not shown) the slide of the debit keyboard is connected by a link to an arm on shaft 48. Shaft 48 is connected by an arm 49' and link 50' to a slide 51' having a projection 52'. Upon depression of any debit key the shaft 48 is rocked and the projection 52' is shifted below a pin 55 on the motor key 1. This prevents the depression of the positive motor key when negative entries are to be summed up.

In a balancing operation, in order to prevent depression of that motor key which does not correspond to the sign of the amount contained in the balance mechanism, a slide 56, Figure 4, is mounted in the motor keyboard which slide upon depression of the motor key 1 is moved upward by the pin 55 of the latter and an inclined slot 57, against the action of a spring 58. When this takes place, another slot 59 comes out the range of the pin 53 of the motor key 2 so that this key is locked. Slide 56 has hinged to it a link in the hook-shaped slot 61 of which is guided a pin 62 of a two-armed lever 64 loose on shaft 63. Lever 64 has a lateral lug 65, Figures 4 and 5, which in a manner described hereinafter can be moved into the path of a locking disc 66 carrying two rises 67. Disc 66 is rigid to a shaft 68 which in known manner is controlled by the balance mechanism in such a manner that the lug 65 is opposite to one of the rises 67, if the amount contained in the balance mechanism is negative. A depression of the motor key, however, is not prevented at this time, since pin 62 is above the vertical section of slot 61 and thus admits upward motion of slide 56.

The link 60, Figures 4 and 3, is connected by link 69 to a double lever 70, mounted on a shaft 75, the pin 71 of which under the action of a spring 72 abuts against a cam sector 73 fixed to the mode of operation lever 45. If the latter is set to "balance", an anticlockwise rotation is imparted to the double lever 70 by a rise 74 of sector 73. When this takes place, link 69 and thus also link 60 is drawn to the right, Figures 3 and 4, whereby pin 62 enters the horizontal section of slot 61. The upward motion of slide 56 is in this case only possible, if no rise 67 is opposite lug 65. Consequently in taking the balance the positive motor key 1 cannot be depressed if the amount contained in the balance mechanism is negative.

On the motor keyboard another system of levers and links 56'—64' is arranged which corresponds to the parts 56—64 and co-operates with the motor key 2 in the same manner as described with reference to motor key 1. The lug 65' of lever 64' is opposite a locking disc 66' fast to shaft 68, the rises 67' being displaced by 90° relatively to the rises 67 and engage below lug 65' if the balance mechanism contains a positive total. Like the link 60, link 60' is also drawn to the right by means of a link 69' connected to the double lever 70, if the mode of operation lever is set to "balance". Thereby the pin 62' arrives in the horizontal section of the slot 61' and in taking the balance prevents depression of the motor key 2, if one of the rises 67' is opposite the lug 65', that means, if the balance mechanism contains a positive total. Furthermore, the two slides 56 and 56' ensure that at any time only one motor key can be depressed.

The machine according to the invention may be modified in so far as the displacement of the two slides 9, 10 to their second position from below is effected independently of the credit and debit keys. This is of importance especially for machines which do not require or comprise totalizers corresponding to the credit and debit totalizers of the above-described embodiment. In this case the parts 38—41, Figure 2, may be dispensed with on the two secondary totalizer keyboards. In lieu thereof an auxiliary slide 76, Figure 7, is provided in the motor keyboard and under the action of a spring 77, its shoulder 78 abuts against a pin 79 of slide 9. The auxiliary slide is formed with two inclined edges 80 which co-operate with the pins 53, 55 of the motor keys 1 and 2, see also Figure 8, in such a manner that when one of these keys is depressed, the auxiliary slide 76 is lifted one unit. When this takes place, the shoulder 78 is removed from pin 79 against the action of spring 77, and, further, a pawl 83 loose on shaft 82 under the action of a spring 81 engages behind a lug 84 of the auxiliary slide 76 and maintains it in its new position.

The shaft 18 has fixed to it an arm 85 having a lug 86 which is engaged by a pawl 88 loose on a shaft 89 under the action of spring 87. To this pawl is rigidly connected an arm 90 the roller 91 of which is in the path of a cam 92 of a cam disc 93 fixed to a shaft 94 which in every machine operation makes a revolution in clockwise direction. By these means the shaft 18 is maintained in its position of rest shown in Figure 7, and the slides 9, 10 are thereby prevented from following the pull of spring 77, if the auxiliary slide 76, as explained, has been displaced one unit in upward direction. This arm 85 is released shortly before the termination of the machine operation by the cam 92 through the roller 91 rocking the pawl 88 clockwise. The spring 77, which is stronger than spring 34, is now capable of shifting the slides 9, 10 from their position I to position II, the pin 79 again engaging the shoulder 78. At the same time shaft 18 has been turned counter-clockwise and has likewise assumed its position II, whereby simultaneously arm 85 has been removed out of the path of pawl 88. As described above, the slides 9, 10 are shifted to positions III and IV by the mode of operation lever. When this takes place, the auxiliary slide 76 is taken along with by pin 79, without exerting any further effect.

Upon returning of the mode of operation lever to the position "addition", the slides 9, 10 and 76 as well as shaft 18 follow the action of spring 34 until all parts have assumed again their position of rest (position I). When this takes place, the inclined edge 95 of arm 85 rocks pawl 88 clockwise. The pawl 88 under the action of its spring 87, immediately engages over the lug 86 on pawl 85 as soon as shaft 18 has reached its position of rest. It is necessary to disengage the pawl 83 before the shaft 18 is returned to normal position, since otherwise the auxiliary slide 76 and thus also the slides 9, 10 and shaft 18 would be maintained in position II. To this end the pawl 83 through a hollow shaft 96 is connected to an arm 97, Figure 3, the projection 98 of which under the action of spring 81 abuts against a pin 99 of an arm 100 connected through a hollow shaft 101 to the double lever 70. As already explained, the latter is turned counter-clockwise by the rise 74 of the sector 73, if the mode of operation lever is set to "balance". Simultaneously pawl 83 is disengaged in clockwise direction through the parts 96—101. The rise 74 is of such a configuration that in returning the mode of operation lever to "addition" the pawl 83 under the action of its spring 81 is capable of returning to its position of rest only if its point is above the point of projection 84, Figure 7.

The mode of operation of the machine illustrated in Figures 1–5 will now be described by describing a book-keeping operation consisting of entering an old balance, transactions and the new balance.

A. Entry of the old balance

The number of the old balance is set in the amount key field and thereupon the motor key 1 or 2 is depressed, according to whether the old balance is positive or negative. Since the mode of operation lever is standing on "addition" and none of the credit or debit keys is down, the slides 9, 10 are in the position I, the keyshafts OC and OD being coupled. Upon depression of one of the motor keys 1 or 2 thus the respective checking totalizer for the positive or negative old balance is selected. The motor keys are not being locked, since none of the projections 52 and 52' is below the keypins 53 and 55 and since, further, the pins 62 and 62' can freely slide in the vertical section of the slots 61 and 61'.

B. Entry of transactions

Besides the amount keys one of the debit or credit keys is depressed. Thereby the slides 9, 10 are shifted to position II and couple the keyshafts E$n$ and D$e$, so that upon depression of one of the motor keys the E$n$- or D$e$-totalizer is selected. Besides, that motor key which does not correspond to the sign of the depressed secondary totalizer key is locked by one of the projections 52 or 52'. The balance contained in the balance mechanism has, like in the operation described in A, no influence on the locking of the motor keys by the slides 56 or 56', so that a positive transaction can be added to a negative old balance and vice-versa.

C. Taking the new balance

To this end the mode of operation lever is set to "balance", whereby the slides 9, 10 are shifted to position IV and the keyshafts NC and ND for the new balances are coupled. Besides, the links 60, 60' have been shifted by the mode of operation lever in such a manner that the pins 62, 62' lie in the horizontal sections of the slots 61, 61'. Hence, only that motor key can be depressed which corresponds to the sign of the amount accumulated in the balance mechanism. The locking members 52 and 52' are ineffective in this machine operation.

D. Taking the intermediate or grand total from the totalizers

To this end the mode of operation lever is set to "subtotal" or "total", whereby the slides 9, 10 are shifted to position III in which none of the keyshafts is coupled. The selection of the totalizers may take place in various manner, for example in known manner by means of totalizer keys or totalizer selecting levers. In the first case upon selection of a credit or debit totalizer one of the motor keys is locked by projection 52 or 52'. Outside the series of the book-keeping operations the checking totalizers are selected by the keyshafts OC, OD, En, De, NC, ND in known manner being depressed again by means of loose key heads that are put thereonto. Simultaneously the machine operation is released thereby, as by the pin of the respective keyshaft one of the slides 9, 10 and thus also one of the two motor keys is entrained. In the second case merely one of the totalizer selecting levers is to be set and a motor key to be depressed.

In the embodiment illustrated the operation differs in so far as the displacement of the slides 9, 10 into their second position from below is not effected by the credit and debit keys, but in the described manner by the auxiliary slide 76 which has been displaced in the first machine operation by the motor keys, the slides 9, 10 through the shaft 18 being held in their position by pawl 88 up toward the end of the first machine operation. If no totalizers exist that correspond to the credit and debit totalizers of the embodiment described, obviously the locking parts 52, 52' and the appertaining systems of levers and links may be dispensed with.

What we claim and desire to secure by Letters Patent is:

1. In a machine of the class described, two motor bars, locking means associated therewith to lock either bar in its undepressed position, a total lever, and connections between the total lever and locking means to render the latter ineffective by movement of the lever.

2. In a machine of the class described, two motor bars, a locking slide associated with each bar, a control device capable of rendering either one slide or the other effective to lock its bar in undepressed position, and a total lever adapted to render the control device effective or ineffective.

3. In a machine of the class described, two motor bars, two key stems, means to couple one key stem to each motor bar for depression therewith, and a differential member so situated as to have its movement controlled by either key stem when depressed.

4. In a machine of the class described, two motor bars, a plurality of key stems, coupling means to selectively connect the key stems to the motor bars for depression therewith, and a differential member so situated as to have its movement controlled by a key stem depressed by either motor bar.

5. In a machine of the class described, two motor bars, two key stems associated with each bar, means to normally couple one of each two stems to each bar, a single means to move the coupling means to couple the other stem of each two to each bar, and means whereby either motor bar and its coupled key stem may be depressed to the exclusion of the other.

6. In a machine of the class described, a motor bar, two key stems, a coupling means, and an adjusting means acting, when moved to either of two positions, to selectively connect the key stems to the motor bar for depression therewith, and acting, when moved to another position, to move the coupling means to an ineffective position, so that the motor bar may be depressed alone.

7. In a machine of the class described, a motor bar, a plurality of key stems, means for normally coupling one of the key stems to the motor bar for depression therewith, a key, means to move the coupling means to couple the motor bar to a second key stem upon depression of the key, a total lever, and means to move the coupling means to couple the motor bar to a third key stem upon movement of the lever.

8. In a machine of the class described, a motor bar, two key stems, a movable coupling means normally connecting one of the key stems to the motor bar for depression therewith, and means, operated upon depression of the motor bar, to control movement of the coupling means to couple the other key stem to the motor bar.

9. In a machine of the class described, a motor bar, two key stems, a movable coupling means normally connecting one of the key stems to the motor bar for depression therewith, means, operated by the depression of the motor bar to control movement of the coupling means to couple the other key stem to the motor bar, a latch to retain the control means in operated position, a lever, and a connection between the lever and latch to release the control means for return movement to its original position, upon depression of the lever.

10. In a machine of the class described, a motor bar, a plurality of control elements, and a movable coupling member normally connecting one of said control elements to said motor bar and differentially shiftable to selectively connect a second one of said control elements or a third of said control elements to said motor bar.

11. In a machine of the class described, two keys, a separate motor bar related to each key, and control means intermediate the keys and motor bars including slides, one actuated by each of said keys and having control means thereon cooperable with the motor bars whereby the operation of one of said keys blocks the motor bar related to the other key against operation and an improper simultaneous operation of both keys blocks both motor bars to prevent an improper operation of the machine.

12. In a machine of the class described, two banks of keys, a motor bar related to each bank of keys, and means including a plurality of slides mounted adjacent the motor keys and having control means thereon cooperating with the motor bars, each of said slides being shifted by the keys in one of said banks to prevent the operation of the motor bar related to the other bank of keys, said slides preventing the operation of both motor bars when a key in each bank is operated at the same time.

ALBERT KLAAR.
FRIEDRICH ARNDT.
HELMUT BERNING.